United States Patent
Fleckenstein

(12) 
(10) Patent No.: US 6,668,683 B2
(45) Date of Patent: Dec. 30, 2003

(54) VEHICLE STEERING WHEEL

(75) Inventor: Jupp Fleckenstein, Bessenbach (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/832,399

(22) Filed: Apr. 11, 2001

(65) Prior Publication Data

US 2001/0027698 A1 Oct. 11, 2001

(30) Foreign Application Priority Data

Apr. 11, 2000 (DE) .......................... 200 06 621

(51) Int. Cl.⁷ .............................. B62D 1/04; G05G 1/10
(52) U.S. Cl. ........................ 74/552; 74/558; 16/421; 280/750
(58) Field of Search ................. 74/552, 557, 558; 16/421, 430, 431, 441; 280/750

(56) References Cited

U.S. PATENT DOCUMENTS

| | | | |
|---|---|---|---|
| 2,623,405 A | | 12/1952 | Sampson |
| 3,802,291 A | * | 4/1974 | Young, Jr. et al. ............ 74/552 |
| 4,581,954 A | * | 4/1986 | Uchida ......................... 74/552 |
| 4,758,470 A | * | 7/1988 | Koyama .................... 74/558 X |
| 4,800,775 A | * | 1/1989 | Iuchi ............................ 74/552 |
| 5,207,713 A | * | 5/1993 | Park ............................ 74/558 |
| 5,224,397 A | * | 7/1993 | Yoo ............................. 74/558 |
| 5,761,968 A | * | 6/1998 | Poteet .......................... 74/558 |
| 6,012,354 A | | 1/2000 | Futschik et al. |
| 6,279,419 B1 | * | 8/2001 | Testa et al. ................... 74/558 |
| 6,282,982 B1 | * | 9/2001 | Testa ........................... 74/558 |
| 6,418,814 B1 | * | 7/2002 | Emeneth et al. .............. 74/552 |

FOREIGN PATENT DOCUMENTS

| | | |
|---|---|---|
| DE | 29910992 | 12/1999 |
| EP | 0849127 | 6/1998 |
| JP | 60151174 | 8/1985 |
| JP | 61-291266 | * 12/1986 |

OTHER PUBLICATIONS

Corres. to U.S. Ser. No. 09/598,866, filed Jun. 21, 2000.

* cited by examiner

Primary Examiner—David A. Bucci
Assistant Examiner—Colby Hansen
(74) Attorney, Agent, or Firm—Tarolli, Sundheim, Covell & Tummino L.L.P.

(57) ABSTRACT

The invention relates to a vehicle steering wheel with a steering wheel rim, the steering wheel comprising a skeleton, and a skeleton covering which is visible from the exterior and has recesses. The skeleton covering is provided in a region of the steering wheel rim. The steering wheel further comprises at least one decorative segment which supplements a part of the skeleton covering and has detent noses which engage into the recesses in the skeleton covering. The decorative segment is a half shell having an essentially clip-shaped form in cross-section and has free edges which are provided with the detent noses.

6 Claims, 2 Drawing Sheets

2

VEHICLE STEERING WHEEL

TECHNICAL FIELD

The invention relates to a vehicle steering wheel comprising at least one decorative segment.

BACKGROUND OF THE INVENTION

Decorative segments are increasingly desired by vehicle purchasers, because they give the vehicle steering wheel a more precious appearance. The fastening of these decorative segments, which form separate parts, on the vehicle steering wheel is costly. For this, for example, in the prior art solutions are provided with inserted additional fastening means such as clips, whereby however, the number of parts increases. Also, the installation is more costly.

BRIEF SUMMARY OF THE INVENTION

The invention provides a vehicle steering wheel, the decorative segment of which can be fastened very simply and securely to the steering wheel. This is achieved in a vehicle steering wheel which comprises a skeleton, and a skeleton covering which is visible from the exterior and has recesses. The skeleton covering is provided in a region of the steering wheel rim. The steering wheel further comprises at least one decorative segment which supplements a part of the skeleton covering and has detent noses which engage into the recesses in the skeleton covering. The decorative segment is a half shell having an essentially clip-shaped form in cross-section and has free edges which are provided with the detent noses. In the vehicle steering wheel proposed, no additional parts are provided for fastening the decorative segment, because the decorative segment itself together with recesses in the skeleton covering form a detent connection. The decorative segment therefore has to be constructed to be sufficiently flexible so that on placing onto the skeleton covering it is widened elastically and finally, as soon as the recesses are reached by the detent noses, it springs back. The skeleton covering, which outside the decorative segment forms the part of the steering wheel rim which is visible from the exterior, usually has a depression or a smaller radial thickness in the region of the decorative segment, in order to achieve as smooth a transition as possible between the decorative segment and the part of the skeleton covering which is visible from the exterior. By the decorative segment being designed as a half shell which embraces the normally soft covering, the latter is compressed. So there is not the danger of the covering tearing out.

The detent connection can be improved in that several detent noses, spaced apart from each other in peripheral direction, are provided on each edge. The detent noses alternate at opposite edges as seen in axial direction. This means that viewed in cross-section through the steering wheel rim, always only one detent nose is visible on an edge. Therefore, the decorative segment is given a greater flexibility for installation.

According to the preferred embodiment, the decorative segment also has spoke covering portions, so that it is constructed as a component having a large area.

The skeleton covering consists of wood, metal or plastic or the foam casing. The recesses are then provided in the wood, metal, plastic or even in the foam casing. In this connection, the foam casing can quite be covered by leather, the leather covering being provided in the visible region of the skeleton covering.

The decorative segment can also be covered with leather, whereby an application of the leather covering can be simplified. The leather is in fact fastened to a plastic shell and this plastic shell and the leather form the decorative segment which then is only fastened to the skeleton covering by means of the detent connection.

DETAILED DESCRIPTION OF THE PREFERRED EMBODIMENTS

Figure 1:
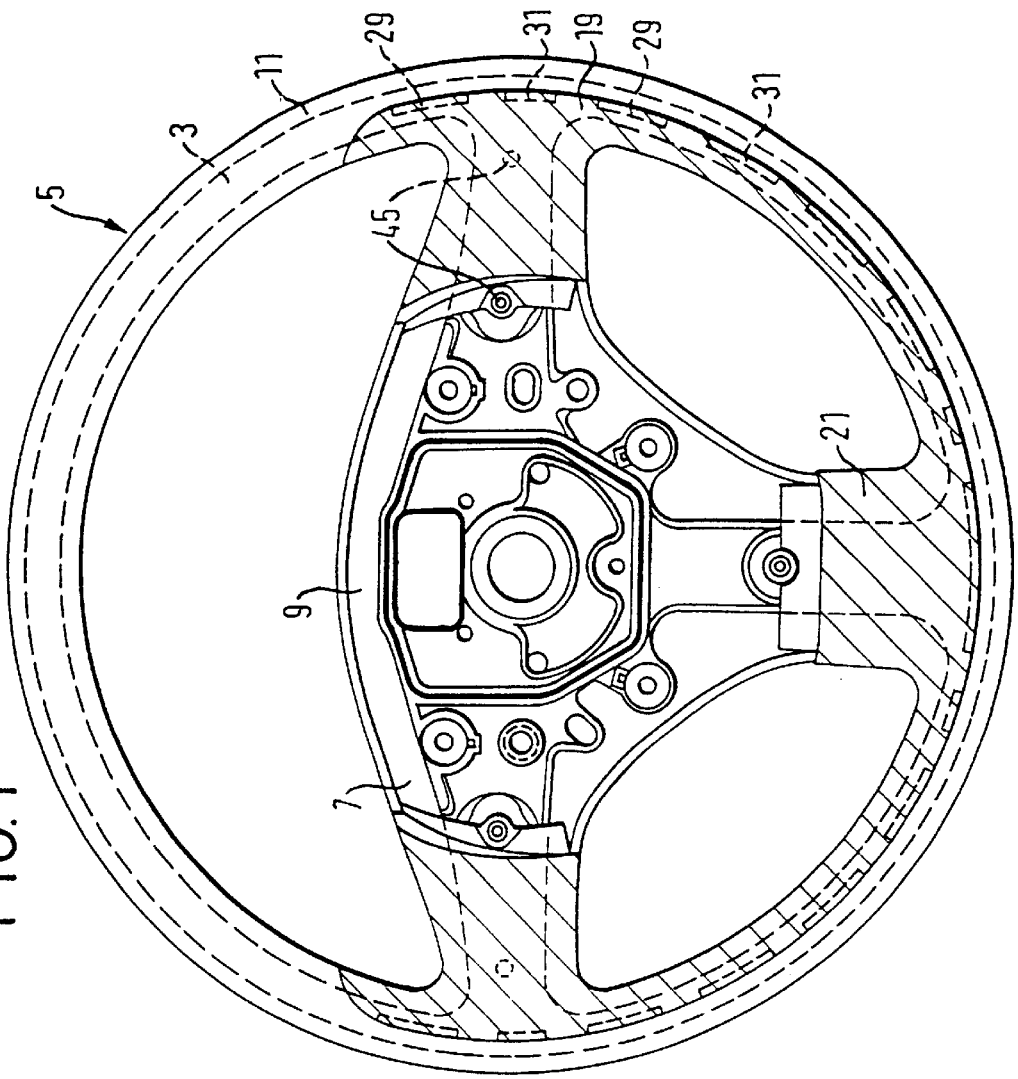
FIG. 1 shows a top view onto a steering wheel according to the invention.
Figure 2:
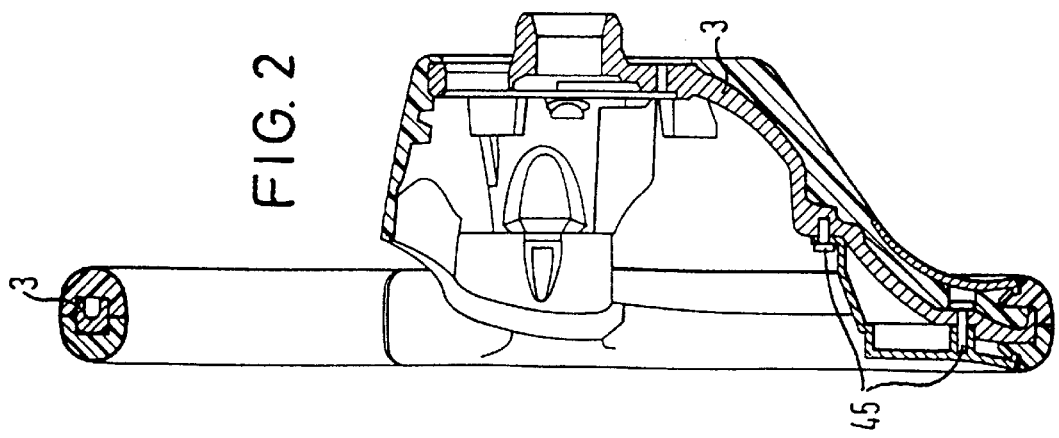
FIG. 2 shows a longitudinal sectional view through the steering wheel according to the invention.
Figure 3:
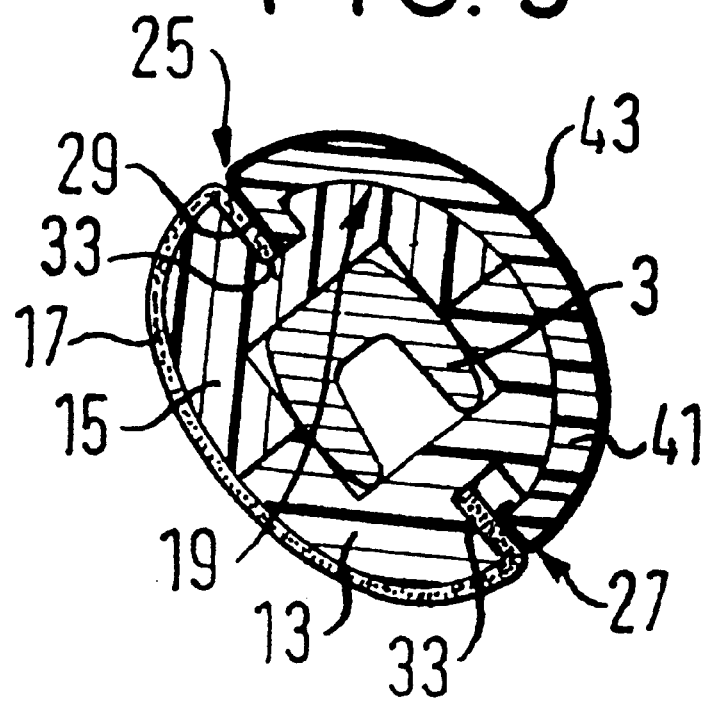
FIG. 3 shows a cross-sectional view through the steering wheel rim in the region of the decorative segment.
Figure 4:
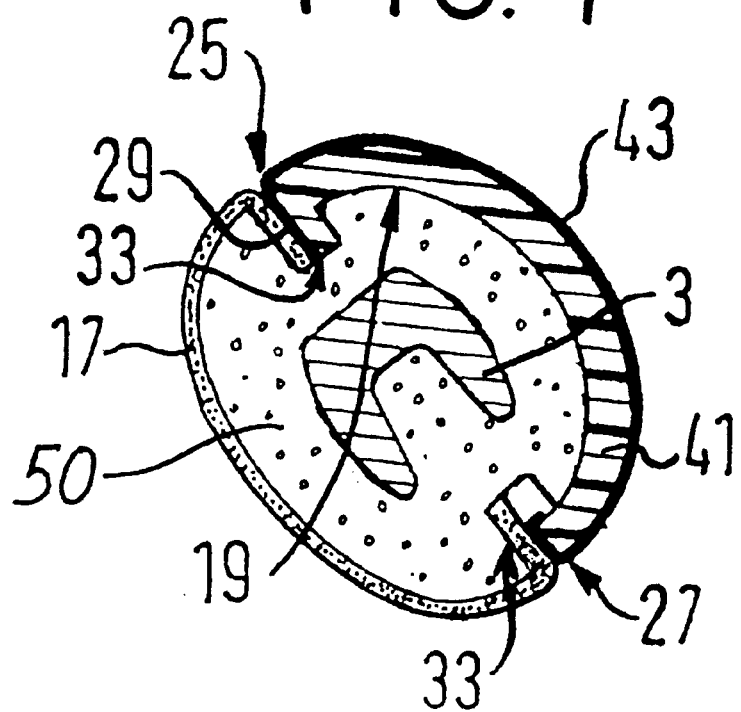
FIG. 4 shows a cross-sectional view through the steering wheel rim in the region of the decorative segment, according to a further embodiment.

In FIG. 1 a vehicle steering wheel is illustrated in top view, which has a steering wheel skeleton 3 which extends through the steering wheel rim 5 and via the so-called spokes 7 to the hub 9. The skeleton 3 is surrounded in the region of the steering wheel rim 5 and the spokes 7 by a skeleton covering 11 which is visible from the exterior. The skeleton covering 11 can for example be a covering consisting of several layers of wood, or also a one-piece foam casing 50 (see FIG. 4). In FIG. 3 the covering is illustrated as consisting of several plastic parts 13, 15, which in the visible region are provided with a leather covering 17. On the rear face of the spokes, the skeleton covering can be formed for example by a foam casing or by the plastic parts 13, 15 or additional plastic parts. A large-area decorative segment 19, which is illustrated in hatched lines in FIG. 1, covers the inner face of the steering wheel rim 5 from above the two opposite spokes to the vertical spoke. The decorative segment 19 has spoke covering portions 21 formed on in one piece and therefore also covers the radially outer regions of the spokes.

The structure of the decorative segment 19 can best be seen from FIG. 3. This, viewed in cross-section, is a C-shaped half shell of clip-shaped form. The free edges 25, 27 have detent noses 29, 31 projecting inwards, which project into recesses 33 in the skeleton covering 11. At each free edge 25, 27, viewed in axial direction, several detent noses 29 and 31 are provided, viewed in axial direction, spaced apart from each other in peripheral direction. The detent noses alternate on both edges, viewed in axial direction, as shown in FIG. 1.

The recesses 33 in the skeleton covering together with the detent noses 29, 31 form a detent- or snap connection.

The decorative segment 19 is constructed so as to be elastic and consists of a plastic shell 41 which has an external leather covering 43. The leather covering extends over the free edges up to the interior of the recesses 33, so that from the exterior no free edge of the leather covering 43 is visible.

The decorative segment 19 is placed simply from above onto the skeleton covering 11. The skeleton covering is designed so as to have a smaller radial thickness in the region of the decorative segment, so that a smooth transition is ensured to the visible region of the skeleton covering.

Self-tapping screws 45 can be provided in addition in order, as an additional security, to provide for the fastening of the decorative segment 19 to the skeleton covering.

The decorative segment can of course also be of wood or provided with an outer layer of wood. Likewise, the skeleton covering does not have to be covered with leather, it can also, as is usual in favorably-priced steering wheels, merely consist of a foam casing (similar to that shown in FIG. 4) which then has corresponding recesses 33. In addition, the skeleton covering can also consist of shell-shaped wooden parts which are constructed in accordance with the shells 13, 15 illustrated in FIG. 3.

What is claimed is:

1. A vehicle steering wheel with a steering wheel rim, said steering wheel comprising:

a skeleton, a skeleton covering which is visible from the exterior and has recesses, said skeleton covering being provided in a region of said steering wheel rim, and at least one decorative segment which supplements a part of said skeleton covering and has detent noses which engage into said recesses in said skeleton covering, said decorative segment being half shell having an essentially clip-shaped form in cross-section and having free edges, a plurality of separate detent noses being provided at both of said free edges, said detent noses at each of said free edges being spaced apart from each other in a peripheral direction with unoccupied gaps interposed between said detent noses, said detent noses alternating at opposite edges as seen in an axial direction.

2. The vehicle steering wheel according to claim 1, wherein said decorative segment also has spoke covering portions.

3. The vehicle steering wheel according to claim 1, wherein said skeleton covering consists of one of the materials wood, metal, plastic and a foam casing, each of which comprising said recesses.

4. The vehicle steering wheel according to claim 3, wherein said foam casing is covered with leather.

5. The vehicle steering wheel according to claim 1, wherein a portion of said skeleton covering which is not covered by said decorative segment, is clad with a leather having edges, said edges being clamped between said free edges of said decorative segment and said skeleton covering.

6. A vehicle steering wheel with a steering wheel rim, said steering wheel comprising:

a skeleton, a skeleton covering which is visible from the exterior and has recesses, said skeleton covering completely surrounding said steering wheel rim as seen in a cross-sectional view through the steering wheel rim, and at least one decorative segment which supplements a part of said skeleton covering and has detent noses which engage into said recesses in said skeleton covering, said decorative segment being a plastic half shell covered with leather and having an essentially clip-shaped form in cross-section and having free edges which are provided with said detent noses, said detent noses at each of said free edges being spaced apart from each other in a peripheral direction with unoccupied gaps interposed between said detent noses, said detent noses alternating at opposite edges as seen in an axial direction.

* * * * *